United States Patent [19]

Quinlan

[11] Patent Number: 4,689,914
[45] Date of Patent: Sep. 1, 1987

[54] VARIABLE BUOYANCY FISHING LURE

[76] Inventor: Leland F. Quinlan, Rte. 1, Box 14A, Westwood, Calif. 96137

[21] Appl. No.: 770,661

[22] Filed: Aug. 28, 1985

[51] Int. Cl.⁴ ............................................. A01K 85/00
[52] U.S. Cl. ................................. 43/42.22; 43/42.26; 43/42.29; 43/42.35; 43/42.42; 43/42.43
[58] Field of Search ............. 43/42.22, 42.09, 44.2, 43/43.2, 43.4, 43.6, 44.6, 44.8, 42.26, 42.13, 42.06, 42.24, 42.28, 42.29, 42.4, 42.7, 42.49, 42.35, 42.39, 42.41, 42.42, 42.43

[56] References Cited

U.S. PATENT DOCUMENTS

| | | | |
|---|---|---|---|
| 849,367 | 4/1907 | Burke | 43/42.22 |
| 2,149,054 | 2/1939 | Jones | 43/42.22 |
| 2,218,280 | 10/1940 | Deering | 43/42.26 |
| 2,486,626 | 11/1949 | Arbogast | 43/42.09 |
| 2,619,764 | 12/1952 | Mellin | 43/42.13 |
| 2,706,359 | 4/1955 | Beames | 43/42.22 |
| 2,817,921 | 12/1957 | Czesnocha | 43/42.29 |
| 3,001,318 | 9/1961 | Miller | 43/42.26 |
| 3,143,824 | 8/1964 | Thomas | 43/42.26 |
| 3,359,674 | 12/1967 | Strumor | 43/42.06 |
| 3,855,722 | 12/1974 | Moore | 43/42.28 |

Primary Examiner—Nicholas P. Godici
Assistant Examiner—G. M. Reid
Attorney, Agent, or Firm—Limbach, Limbach & Sutton

[57] ABSTRACT

A fishing lure adaptable for fishing at different depths and capable of providing varying visual presentations. The lure includes a hollow resilient head member having a vent opening which receives one end of a vent plug. The shank of a hook extends through the head member, with the hook eyelet being secured to a lead line by way of a wire arm assembly. Preferably, a spinner blade is also attached the assembly. A skirt dressing is provided with a flexible collar and several simulated tentacles which extend from the collar. The collar encircles the central portion of the vent plug, with the collar also serving to secure an anti-fouling apparatus to the lure so as to prevent weeds and the like from snagging on the hook. The specific gravity of the lure may be changed by introducing and removing water from the hollow head member through the vent opening. The lure presentation may be altered by changing skirt dressings and by attaching simulated worms and the like to the vent plug.

13 Claims, 5 Drawing Figures

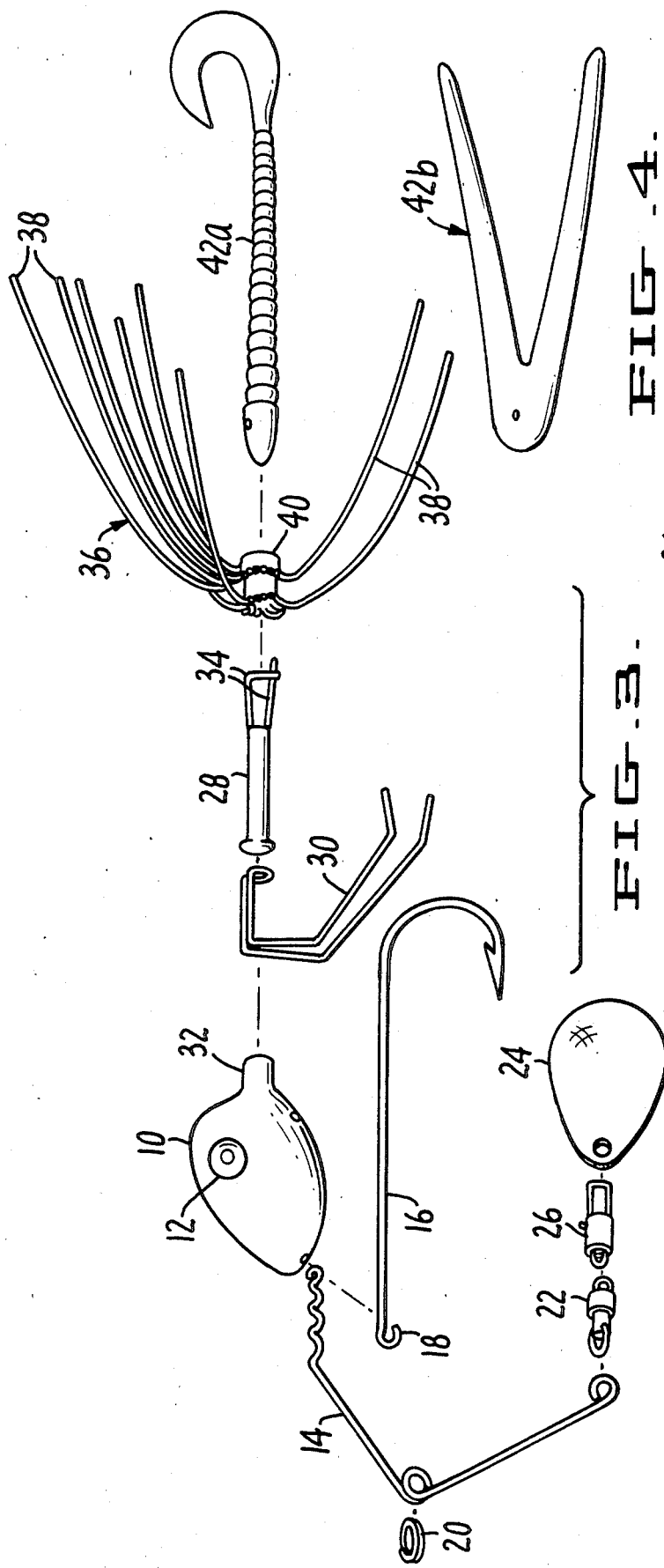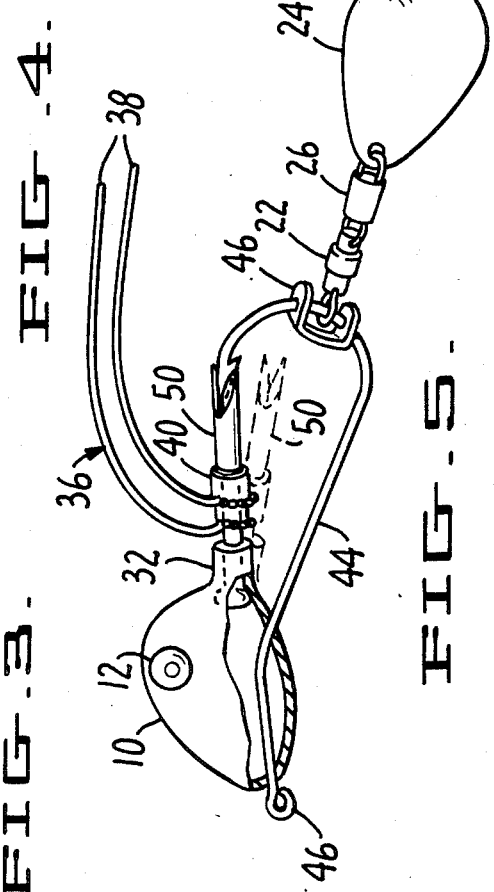

VARIABLE BUOYANCY FISHING LURE

FIELD OF THE INVENTION

The subject invention relates generally to fishing tackle and more particularly to a sport fishing lure intended for bass and the like.

BACKGROUND ART

There exist many fishing lures specially adapted for bass fishing. One such lure is disclosed in the May 1985 issue of *Pro Bass* magazine, pp. 58–61.

A principal disadvantage of existing fishing lures is that separate lures must be used for bottom fishing, surface fishing and for intermediate depths. Similarly, separate lures must be used to provide varying visual presentations to the fish.

In the event a lure is to be used for waters having weeds and the like, it is necessary to configure the lure so as to minimize the likelihood that the lure will become fouled. Typically, the point of the lure hook is imbedded in a resilient portion of the lure so as to prevent the hook from snagging thereby providing what is commonly referred to as a weed-less lure. A disadvantage of this approach is that the hook is less likely to successfully achieve a solid hook-up on every hit or strike.

The subject invention overcomes the above-noted limitations of existing fishing lures. A single lure of the subject invention can be utilized for surface, bottom and intermediate depth fishing. The visual presentation of the subject lure can be readily altered without the necessity of disconnecting the lure from the line. In addition, a weed-less lure is achieved wherein the top of the hook is not imbedded, so as to increase the likelihood that a hook-up will be accomplished on a strike. These and other advantages of the subject invention will be apparent to those having ordinary skill in the art upon a reading of the following Best Mode For Carrying Out The Invention together with the drawings.

DISCLOSURE OF THE INVENTION

A fishing lure adaptable for fishing at different depths and capable of providing varying visual presentations is disclosed. The lure includes a hollow, resilient head member, having a vent opening in communication with the interior of the member. Preferably, a pair of simulated eyes are mounted on the head member. A vent plug having a first end disposed within the vent opening is provided. The plug may include an enlarged diameter end section disposed within the head member so as to firmly secure the plug to the head member.

The lure further includes a hook having a shank which passes through the head member. In one embodiment, the hook eyelet is attached to one end of a wire arm assembly, with the remaining end being attached to a spinner blade. A loop is formed in the central portion of the arm assembly for coupling to the line.

The lure also preferably includes a skirt dressing having a collar and plurality of simulated tentacles which extend from the collar. The collar is stretched over the vent plug encircling the plug so that different skirt dressings can be substituted thereby altering the visual presentation of the lure. In addition, a flexible elongated member such as a simulated worm can be detachably fastened to the free end of the vent plug so as to further alter the appearance of the lure.

An anti-fouling apparatus may be also be provided which prevents the lure from being snagged on weeds and the like. The apparatus is preferably formed from a single length of wire which is extended around the vent plug and down to a position past the point of the hook. The anti-fouling apparatus is preferably secured to the vent plug by the resilient collar of the skirt dressing.

The specific gravity of the lure may be adjusted by introducing water into the head member through the vent opening. This may be accomplished by manually squeezing and releasing the head member while the member is immersed. The vent plug need not be removed during this operation. The head member is filled with air for surface fishing and partially with air and water for intermediate depths fishing and slow sinking action.

BRIEF DESCRIPTION OF THE DRAWINGS

FIG. 3 is an exploded view of the FIG. 1 embodiment.

FIG. 4 shows an alternative tail assembly for use with the FIG. 1 embodiment.

FIG. 5 is an elevational perspective view of a second embodiment of the subject invention.

BEST MODE FOR CARRYING OUT THE INVENTION

Figure 1:
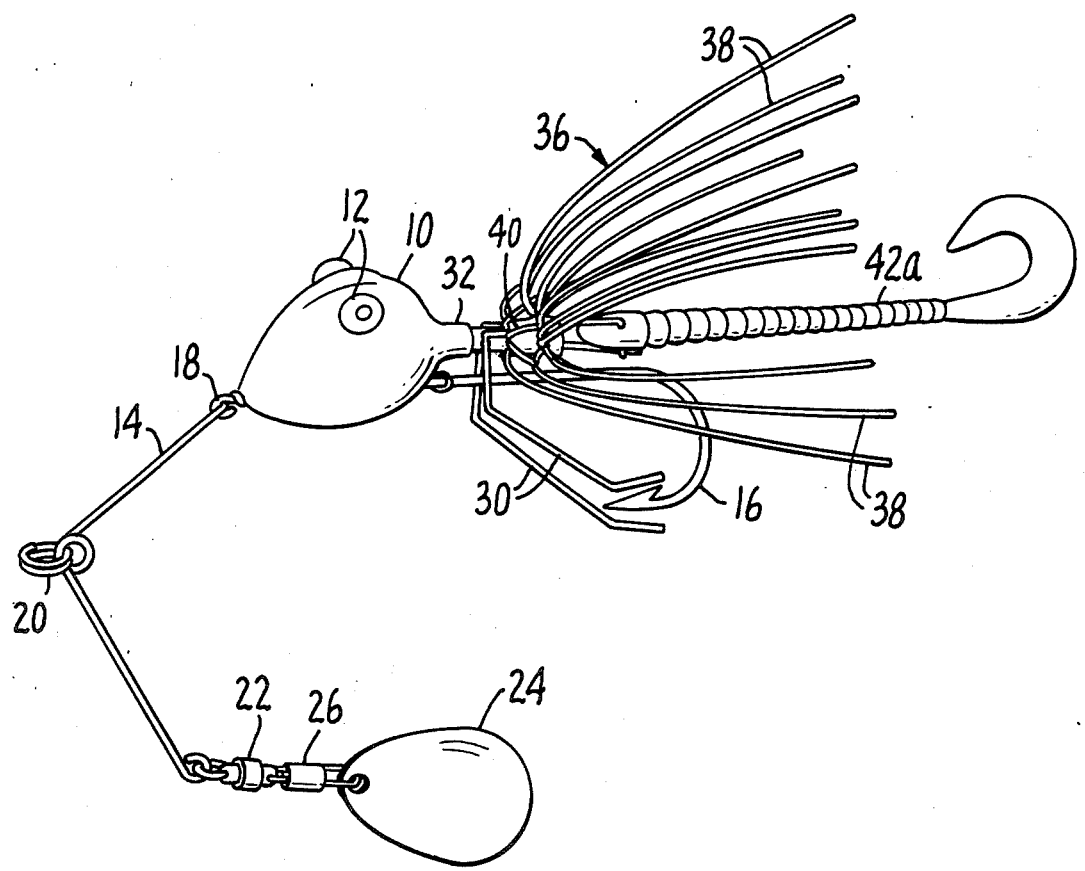
FIG. 1 is an elevational perspective view of a first embodiment of the subjection invention.

Referring now to the drawings, a first embodiment of the subject invention is shown in FIGS. 1–4. The first embodiment includes a hollow head member 10. Member 10 is preferably molded from a resilient material such as rubber. The material has a memory such that when the member is collapsed by manually squeezing the sidewalls together, the member will, upon release, return to a normal expanded state.

A pair of spaced apart simulated eyes 12 are secured to the surface of head member 10 utilizing a suitable adhesive such as rubber cement. Eyes 12 are of the type commonly used in toy dolls and the like and preferably include a free moving "pupil" member (not designated) captured within an outer transparent assembly. As a result, eye motion will be simulated as the lure moves through the water.

Head member 10 includes an integral resilient sleeve 32 which extends away from the rear of the member. A vent opening 29 extends through the center of the sleeve which is in communication with the interior of member 10.

A relatively rigid vent plug 28 is provided having a central diameter slightly larger than the diameter of vent 29. Plug 28 has an enlarged diameter end section (not designated) at one end. The end section functions to secure the plug to head member 10 when the plug is forced through vent 29, as depicted in FIG. 2.

A hook 16 is secured to head member 10. The shank of the hook is at a slight angle with respect to the axis of plug member so that the hook extends away from the head member. The manner in which hook 16 is secured to head member 10 will be subsequently described.

Figure 2:
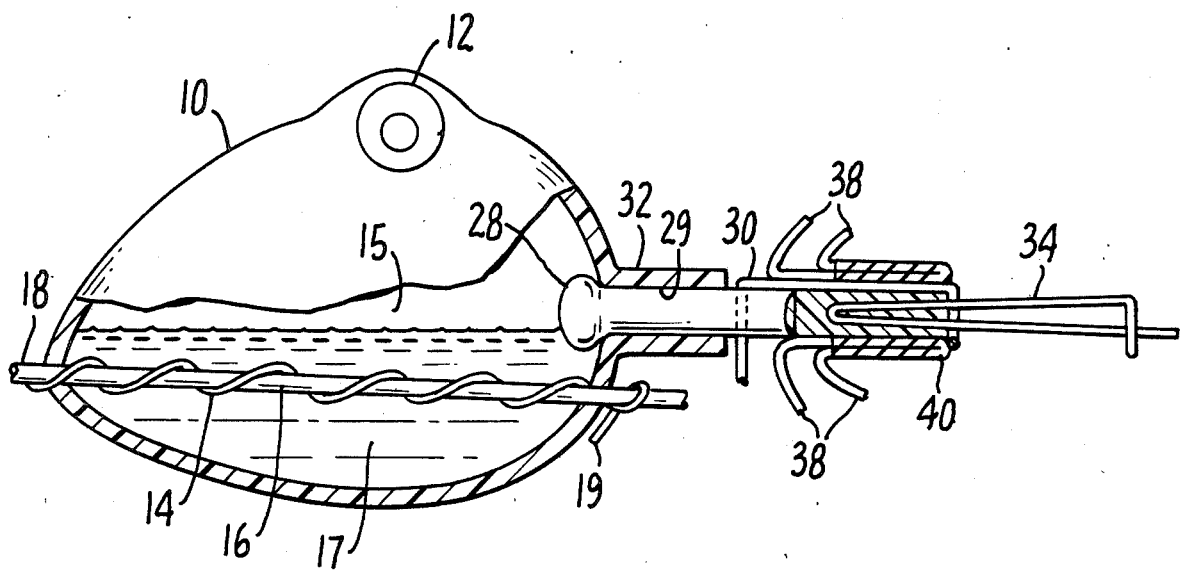
FIG. 2 is an enlarged fragmentary view of the FIG. 1 embodiment showing a partial cross-section of the head member, vent plug and associated apparatus.

As can best be seen in FIG. 2, a fastener clip 34 is secured to the end of plug 28 opposite to the expanded diameter section. Clip 34 is preferably fabricated from a single length of springy 0.035 stainless steel wire which has a central U-shaped bend which is imbedded within plug 28. The clip is imbedded during the molding of plastic plug 28. The two segments of the clip 34 are generally parallel and extend away from plug 28. One segment terminates in a straight section and the other segment terminates in a bent section which intersects the straight section.

A skirt dressing, generally designated by the numeral 36, is provided having a skirt collar 40 and several strands or simulated tentacles 38 extending away from the collar. Dressing 36 is made from a highly flexible material such as rubber. Collar 40 has an inner diameter slightly smaller than the outer diameter of plug 28 so that when the collar is slipped over the plug, the dressing will be securely held in place.

The first embodiment lure further includes an elongated tail assembly 42a made of a very soft flexible rubber. Conventional artificial worms are suitable for this application. In addition, as shown in FIG. 4, pork rinds 42b can also be utilized as a tail assembly. Pork rinds may be cut to simulate worms and the like and can be dyed in various colors.

Fastener clip 34 functions to detachably secure the tail assembly 42 to vent plug 28. The assembly is secured by separating the two segments of clip 34. The straight segment is then forced into the center of one end of the tail assembly. The segments are then released so that the transverse or bent end of the remaining segment will pierce the side of the tail assembly, thereby preventing the assembly from sliding off the straight segment.

An anti-fouling apparatus 30 is fastened to vent plug 28 so as to prevent hook 16 from snagging on weeds and the like. Apparatus 30 is preferably fabricated from a single length of 0.035 stainless steel wire. A central loop is formed in the wire which extends approximately one-half way around plug 28. Two parallel segments of the wire are formed which are parallel with plug 28.

Apparatus 30 further includes two additional wire segments which extend away from plug 28 and which terminate slightly below the barb of hook 16, with the ends preferably being spaced apart from one another and from the hook. The downward extending wire segments have sufficient stiffness to deflect the lure away from underwater obstacles such as weeds but are sufficiently flexible so as not to interfere with hooking a fish.

As previously noted, the shank of hook 16 extends through the interior of head member 10. The hook eyelet 18 is positioned abutting the forward wall of member 10. A wire arm assembly 14 is provided for securing the lead line (not shown) to the subject lure.

Arm assembly 14 is formed from a single strand of 0.026 stainless steel wire. Arm assembly 14 includes a central turn which receives a split-ring eyelet 20. The lead line is secured to the eyelet. A wire segment extends away from the central turn and terminates in a loop. The loop receives one end of a ball bearing swivel fastener 22.

A second wire segment of arm assembly 14 extends away from the central turn in a direction generally opposite to that of the first segment. The second segment extends through eyelet 18 of hook 16 and is wound tightly around the shank of the hook so as to form a spiral. Approximately six or more turns is satisfactory.

In assembling head member 10, hook 16 and wire arm assembly 14, the second wire segment of the assembly is first extended through a hook eyelet 18 and wound around the shank of the hook. The end of the wire segment is initially positioned flat against the hook shank. Next, the point of the hook is pushed through the forward wall of head member 10 at a location which will be the final position of eyelet 18. The hook point is then forced through the opposite wall of the head member, at a location where the hook shank is to exit the member. It may be helpful to manually compress the head member so that the forward and rear walls of the member are adjacent to one another when the walls are pierced by the hook.

Once the two walls are pierced, the hook is pulled through the head member until eyelet 18 is abutting the member. The wire segment of arm assembly 14 wound around the hook shank is pulled through the openings in the walls of member 10 along with the shank. Once the hook is in a final position, the end of the wire segment extending through the pierced opening in the member is bent away from the hook shank to form a stop 19 (FIG. 2) thereby securing the hook in place.

The remaining end of swivel fastener 22 is connected to a convention snap fastener 26. Fastener 26 functions to fasten various types and sizes of spinner blades 24 to the lure. The two segments of wire arm assembly 14 are bent towards one another so that the head member 10 and spinner blade 24 are displaced behind split ring 20 when the lure is pulled through the water.

Once the hook is secured to the head member, the remaining portion of the subject lure may be easily assembled. The anti-fouling apparatus 30 is placed over the vent plug 28, the bent portion of the apparatus position at the end of the plug. Expandable collar 40 of skirt dressing 36 is then passed over fastener clip 34 and slipped over the vent plug and the section of apparatus 30 adjacent the plug. The stretched collar serves to secure the skirt dressing 36, anti-fouling apparatus 30 and vent plug 28 together. The tail assembly can then be attached to the lure utilizing fastener clip 34. Finally, the expanded diameter end section of plug 28 is pushed through vent 29 of head member sleeve 32 until the end section is positioned within the head member interior, thereby preventing the plug from slipping out of the vent. The expanded end section is necessary since there is a relatively loose seal between sleeve 32 and the vent plug.

The disclosed first embodiment lure can be utilized for surface, bottom and intermediate depth fishing. The specific gravity of the lure can be readily controlled by varying the ratio of air to water present in head member 10. The exact ratio required for a given fishing depth will depend upon many factors, including the weight of spinner blade 24.

The air/water ratio may be adjusted by simply gripping head member 10 between the thumb and forefinger and immersing the lure in water. If the head member is to be completedly filled with water, the member is completely collapsed by squeezing the member until all air is forced out around plug 28 through vent 29. The member is then released so that the member will expand with the resultant vacuum drawing water (FIG. 2) into the interior of the member, primarily through vent 29, but also through the hook openings in the walls of the member. Vent plug 28 should remain seated in the head member 10 during the operation.

If the head member is permitted to completely expand while immersed, the member will almost completely fill with water. The lure would then be used for bottom fishing. If the head member is only partially released while immersed and then released completely while not immersed, the member will be filled with air 15 and water 17 as depicted in FIG. 2. When the lure is cast into the water, the internal air pressure within the head member will prevent further water from entering. The lure may then be used for intermediate depth fishing or for slow sinking action. Finally, the lure may be collapsed in air, thereby driving any water present out of the member, and then released in air so that the member is substantially filled with air. In that case, the lure is suitable for surface fishing.

It should also be noted that various types and colors of skirt dressing 28 may be used to change the visual presentation of the lure. The dressing can be easily removed from and replaced on vent plug 28 without the necessity of removing the lure from the line. Similarly, various tail assemblies 42 of different colors, sizes and shapes may be used. The assemblies can be readily secured to the lure and detached by virtue of fastener clip 34. Thus, a single lure can be utilized in lieu of an entire array of lures so as to accommodate a wide variety of fishing conditions.

The first embodiment lure may be modified by deleting the wire arm assembly 14, spinner blade and associated hardware. In that event, the lead line is fastened directly to the hook eyelet 18. Preferably, a retaining band is secured to the hook shank to perform the function of bend 19 (FIG. 2) of the unmodified first embodiment.

Referring now to FIG. 5, a second embodiment lure is depicted with elements common to the first and second embodiments being designated with the same numerals. The second embodiment includes a hollow flexible head member 10 having simulated eyes 12 and a vent in communication with the interior of the head member which extends through a sleeve 32.

A vent plug 50 is provided having an enlarged diameter end section which is normally positioned within the interior of head member. The end of the plug opposite the enlarged end section has an inclined surface and a notch on the surface for receiving the barb of a hook 44. As will be subsequently explained, vent plug 50 provides the further function of a weed guard.

Hook 44 has a shank which extends through spaced-apart pierced openings in the walls of head member 10. The hook is positioned such that the barb normally rests within the notch formed on vent plug 50, with the hook eyelet abutting the head member 10. The resilient walls of head member 10 act as a tensioning element which biases the hook barb against plug 50. Thus, weeds and the like will not snag on the lure. When a fish strikes the lure, the force of the strike is sufficient to deflect the vent plug 50 relative to the hook 44, as shown in phantom, so that a hook-up can occur. The shank of hook 44 is preferable slightly bent such that the section of the shank near eyelet 46 is generally parallel with vent plug 50.

The second embodiment lure further includes a skirt dressing 36 which comprises a skirt collar 40 which is fitted over plug 50 and several flexible simulated tentacles 38 extending away from the collar. A ball bearing swivel connector 22 is included having an eyelet which is slid over hook eyelet 46 and is positioned at the bend of the hook. A rubber retainer 48, formed from a small length of rubber and having a pair of spaced-apart openings is slipped over the hook shank adjacent both sides of the swivel fastener eyelet. Retainer 48 prevents the swivel connector from moving on the hook.

The remaining eyelet of swivel fastener 22 is coupled to a snap fastener 26. Fastener 26 serves to couple a spinner blade 24 to the lure.

The specific gravity of the second embodiment lure can be adjusted by changing the air/water ratio of head member 10 in the same manner as previously described in connection with the first embodiment. In addition, the visual presentation of the lure can be altered by substituting different sized and colored skirt dressings.

Thus, two embodiments of a novel fishing lure have been disclosed. Although the two embodiments have been described in some detail, it is to be understood that various changes could be made by those skilled in the art without departing from the spirit and scope of the subject invention as defined by the appended claims.

I claim:

1. A fishing lure comprising:
   a hollow, flexible head member having a vent opening in communication with the interior of said head member;
   adjustment means for adjusting the ratio of water to air within said head member by manually collapsing and releasing said head member, said adjustment means including a vent plug having a first end disposed within said vent opening;
   a hook having a hook shank coupled to said head member;
   a skirt dressing having a collar which encircles said vent plug and a plurality of simulated tentacles which extend from said collar;
   an elongated flexible member; and
   fastening means for detachably fastening said flexible member to said vent plus, said fastening means including a pair of metal wires extending away from said vent plug, with one of said wires terminating in a bent section which pierces said flexible member.

2. The lure of claim 1 further including anti-fouling apparatus in the form of a pair of spaced-apart prongs which extend from said vent plug on opposite sides of said hook.

3. The lure of claim 2 wherein said anti-fouling apparatus is formed from metal wires.

4. The lure of claim 3 wherein said anti-fouling apparatus is formed from a single strand of metal wire which extends around said vent plug.

5. The lure of claim 4 wherein said anti-fouling apparatus is secured to said vent plug by said collar of said skirt dressing.

6. The lure of claim 1 further including a spinner blade and an elongated arm assembly having a first end coupled to said head member and a second end coupled to said spinner blade.

7. The lure of claim 6 wherein said arm assembly is formed from metal wire and has a central loop for coupling to a lead line.

8. A fishing lure comprising:
   a hollow, resilient head member having a vent opening in communication with the interior of said head member;
   adjustment means for adjusting the specific gravity of said lure by manually collapsing and releasing said head member, said adjustment means including a relatively rigid plug having a first end disposed within said vent opening; and
   a hook having a hook shank which extends through said head member and a barb which is biased against a second end of said vent plug by said head member.

9. The lure of claim 8 further including a skirt dressing having a collar which encircles said vent plug and a plurality of simulated tentacles which extend from said collar.

10. The lure of claim 8 further including a spinner blade and a swivel fastener for fastening said spinner blade to said hook.

11. The lure of claim 8 wherein said first end of said vent plug terminates in an enlarged diameter end section which is disposed within said interior of said head member.

12. The lure of claim 11 further including a pair of simulated eyes mounted on said head member.

13. A fishing lure comprising:

a hollow, resilient head member having a vent opening in communication with an interior chamber formed by the head member;

a pair of simulated eyes disposed on said head member;

adjustment means for varying the ratio of air to water within said chamber by manually collapsing and releasing said head member, said adjustment means including a solid vent plug having a first end disposed within said vent opening, with said first end terminating in an enlarged diameter end section which is disposed within said interior chamber of said head member;

a skirt dressing having a collar which encircles said vent plug and a plurality of simulated tentacles which extend from said collar;

an elongated flexible member; and fastening means for detachably fastening said elongated flexible member to a second end of said vent plug.

* * * * *